United States Patent [19]

Short et al.

[11] Patent Number: 4,843,133

[45] Date of Patent: Jun. 27, 1989

[54] POLYMERIZATION AND CATALYSTS

[75] Inventors: James N. Short; Max P. McDaniel, both of Bartlesville, Okla.

[73] Assignee: Phillips Petroleum Company, Bartlesville, Okla.

[21] Appl. No.: 733,838

[22] Filed: Jun. 10, 1985

Related U.S. Application Data

[62] Division of Ser. No. 101,375, Feb. 7, 1979, Pat. No. 4,565,795.

[51] Int. Cl.⁴ .......................... C08F 4/66; C08F 10/02
[52] U.S. Cl. ..................................... 526/129; 526/128
[58] Field of Search .......................... 526/124, 128, 129

[56] References Cited

U.S. PATENT DOCUMENTS

| 2,840,551 | 6/1958 | Field et al. | 526/132 |
| 3,513,150 | 5/1970 | Matsuura et al. | 526/352 |
| 3,718,636 | 2/1973 | Stevens et al. | 526/124 |
| 3,787,384 | 1/1974 | Stevens et al. | 526/129 |
| 3,888,789 | 6/1975 | Dombro et al. | 526/124 |
| 4,175,170 | 11/1979 | Schweier et al. | 526/129 |
| 4,239,873 | 12/1980 | Cesca et al. | 526/114 |
| 4,258,159 | 3/1981 | Bienfait | 526/124 |
| 4,288,578 | 9/1981 | Hsieh | 526/124 |
| 4,299,936 | 11/1981 | Candlin et al. | 526/129 |
| 4,301,029 | 11/1981 | Caunt et al. | 526/128 |
| 4,311,817 | 1/1982 | Morita et al. | 526/124 |

FOREIGN PATENT DOCUMENTS 2543219  4/1977  Fed. Rep. of Germany ...... 526/124

Primary Examiner—Edward J. Smith
Attorney, Agent, or Firm—A. W. Umphlett

[57] ABSTRACT

Polymerization of olefins in the presence of a catalyst system comprising a titanium-containing component A associated with a chemically treated silica-containing composition and a dihydrocarbylmagnesium compound and a cocatalyst component B comprising metal hydride or organometal compound derived from an element of Groups IA-IIIA of the Periodic Table.

2 Claims, No Drawings

POLYMERIZATION AND CATALYSTS

This application is a division of application Ser. No. 101,375, filed Dec. 7, 1979, now U.S. Pat. No. 4,565,795.

This invention relates to the polymerization of olefins. In another aspect, this invention relates to a novel catalyst system useful for the polymerization of 1-olefins, especially for the production of ethylene polymers. In accordance with another aspect, this invention relates to a method of preparing a titanium-containing composition associated with a chemically treated particulate silica-containing composition and a dihydrocarbylmagnesium compound useful as a catalyst component for the polymerization of 1-olefins. In a further aspect, this invention relates to a process for the polymerization of olefins in the presence of a catalyst comprising a catalyst component A which is obtained as the reaction product of a chemically treated particulate silica, a dihydrocarbylmagnesium compound and a halogenated tetravalent titanium compound and a catalyst component B comprising a metallic hydride or organometallic compound containing a metal of Groups IA, IIA and IIIA of the Periodic Table. In another aspect, this invention relates to the use of selected chemical reagents for the treatment of silica containing supports which are reacted with a dihydrocarbylmagnesium compound and a halogenated tetravalent titanium compound which is combined with a cocatalyst yielding a catalyst composition effective in the production of polymers in the form of free flowing spheres with little or no fines coupled with control of polymer melt index and molecular weight distribution.

It is known to polymerize $\beta$-olefins and mixtures thereof according to the low pressure process of Ziegler. In this process, the catalysts used are prepared from mixtures of compounds of elements of subgroups IV–VI of the Periodic Table and the organometallic compounds of the elements of Groups I–III of the Periodic Table. The polymerization is generally carried out in suspension, in solution or even in a gaseous phase.

The activity of an olefin polymerization catalyst is one important factor in a continuous search for a catalyst useful for the polymerization of $\beta$-olefins. It is also desirable that the process used in forming the catalysts be such as to allow ease in preparation and to allow control over the final catalysts formed.

Accordingly, an object of this invention is to provide an improved process for the polymerization of olefins.

Another object of this invention is to provide a novel and improved polymerization catalyst.

Another object of this invention is to provide a two-component catalyst system effective for the polymerization of olefins.

Other objects, aspects and the several advantages of this invention will become apparent to one skilled in the art upon reading this specification and the appended claims.

In accordance with the invention, a titaniumcontaining catalyst component A is prepared by the reaction between (a) a chemically treated particulate silica composition containing at least 80 weight percent silica, (b) an organomagnesium compound and (c) a halogenated tetravalent titanium compound.

Further in accordance with the invention, a polymerization catalyst is provided comprising a titaniumcontaining component A as defined above and a cocatalyst component B comprising a metallic hydride or organometallic compound of an element of Groups IA, IIA and IIIA of the Periodic Table.

In accordance with a specific embodiment of the invention, the particulate silica-containing support which contains at least 80 wt. % silica is treated with at least one of a chlorinating compound, a lower alkanol, a silating compound, an acid chloride, and an organoboron compound.

The polymeric products, especially ethylene polymers, formed from the catalyst of this invention are of particular interest since the polymers are in the form of free flowing spheres with little or no fines. Such a product is commercially attractive since it can be used as is without requiring an intermediate extrusion step to obtain pellets. Polymer pellets are generally used for most end use applications since they feed uniformly and evenly to the extruder, injection molder, etc., whereas most polymer fluff tends to feed erratically. In addition, ethylene polymers made with certain catalysts of the invention exhibit broader molecular weight distribution than that prepared with a control catalyst.

In one embodiment, the catalyst is formed in a multistep process comprising (a) chemically treating particulate silica-containing base with at least one of a chlorinating compound, an alkanol, a silating compound, a carboxylic acid chloride and an organoboron compound, (b) contacting the product of a (a) with a dihydrocarbylmagnesium compound and (c) treating the product of (b) with a halogenated tetravalent titanium compound. The solid final product is separated from the reaction mixture, washed with a dry hydrocarbon to remove unreacted titanium compound and dried to obtain catalyst component A as a solid particulate material.

The silica-containing base used in step (a) consists of silica, silica-alumina, silica-boria, silicathoria, silica-titania, silica-zirconia, or mixtures in which the silica content ranges from about 80 to 100 weight percent. The various silicas can be prepared conventionally, employing precipitation and coprecipitation methods of formation as well as physically mixing particulate solids of each metal oxide. The base is calcined in air at an elevated temperature such that undue decrease in the surface silanol population is not adversely affected. For a silica base itself, for example, the calcining temperature can range from about 400° C. to about 710° C. Generally, as the calcination temperature of the silica increases, the activity of catalyst made from the silica also increases.

Chemical treatment of the silica supports relates to contacting the dry material with an agent selected from a chlorinating compound, an alkanol, a silating compound, an acid chloride, and an organoboron compound. The purpose of preparing catalysts with the treated supports is to allow at least some control of the melt index and molecular weight distribution of polymers made in their presence relative to polymers prepared from similar catalysts produced with untreated silica. In addition, the polymers exhibit a desirable particle size distribution typical of those polymers made in the presence of silicasupported catalysts.

Each chemical employed to contact the particulate silica reacts with part or substantially all of the OH groups on the surface of the silica depending upon the nature of the chemical and on the reaction conditions. The amount of chemical actually reacting can range from about 0.1 to about 1.8 mmols chemical per gram (16.6 mmoles) silica and more preferably from about 0.8 to about 1.7 mmols per gram silica. In terms of mole ratios silica to chemical, the corresponding values range from about 9:1 to about 166:1 broadly and from about 20:1 to about 166:1 more preferably. Since complete reactivity is not found in practice, the actual quantity of each chemical employed can be in excess of that theoretically required. Thus, the mole ratio of silica to chemical generally ranges from about 0.1:1 to about 166:1.

The conditions for contacting the silica supports with the chemical agents can vary appreciably depending upon the amounts of agent to be incorporated into the support. The conditions of treatment will be sufficient to provide an activating amount of agent into the support. Generally, the temperature of treatment will range from about 100° C. to about 900° C., preferably from about 250° C. to about 800° C. and the length of time of treatment can range from a few minutes to several hours.

The chlorinating compound is selected from the group consisting of $CCl_4$, $COCl_2$, $SOCl_2$, $SO_2Cl_2$ and $S_2Cl_2$. $CCl_4$ is presently preferred because of availability.

The alkanol is a linear 1-alkanol containing from 1 to about 5 carbon atoms. Methanol is presently preferred because of ready availability and relatively low cost.

The silating compound is a chlorosilane which can be expressed as $SiR^2_cCl_{4-c}$ in which $R^2$ is phenyl or alkyl group of 1 to about 6 carbon atoms, and c is an integer of 1, 2, or 3. Exemplary compounds include trichloromethylsilane, dichloropropylsilane, chlorotrimethylsilane, chlorotriphenylsilane, trichloro-n-pentylsilane, and the like, and mixtures thereof.

The carboxylic acid chloride can be expressed as:

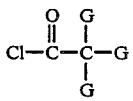

in which each G is selected from chlorine, alkyl of 1 to about 3 carbon atoms, hydrogen, and phenyl, with at least one G being chlorine. Thus concerning the other two G's, one can be alkyl or phenyl or one of each, or one can be hydrogen and the other can be alkyl or phenyl. Exemplary compounds include chloroacetyl chloride, dichloracetyl chloride, phenylchloroacetylchloride, 2,3-dichloropropionyl chloride, 2-chloropropionyl chloride, 2-chloro-2-methylpropionyl chloride, and the like, and mixtures thereof.

The organoboron compound is preferably a trihydrocarbylboron which can be expressed as $B(R^3)_3$ in which each $R^3$ can be selected from among hydrogen, alkyl, aryl and cycloalkyl, at least one $R^3$ in each compound being a hydrocarbon radical containing from 1 to about 6 carbon atoms. Exemplary compounds include trimethylborane, triethylborane, tri-n-hexylborane, tricyclopentylborane, triphenylborane, methyldiethylborane, n-propyl-n-hexylborane, and the like, and mixtures thereof. The trialkylboranes are preferably utilized because of their availability and ease of handling.

The dihydrocarbylmagnesium compound can be expressed as $MgR_2$ in which each R is the same or different and is a hydrocarbon radical selected from among alkyl, cycloalkyl, aryl, alkaryl, aralkyl, and alkenyl groups having from 1 to about 12 carbon atoms. Exemplary compounds include dimethylmagnesium, diethylmagnesium, di-n-butylmagnesium, didodecylmagnesium, di(4-t-butylphenyl)magnesium, and diisopropenylmagnesium.

The halogenated, tetravalent titanium compound can be represented by $TiX_n(OR')_{4-n}$ in which X is bromine, chlorine, or iodine, R' is a hydrocarbon radical containing from 1 to about 12 carbon atoms selected from among alkyl, cycloalkyl, aryl, alkaryl, and aralkyl, and n is an integer of 3 or 4. Exemplary compounds include titanium tetrachloride, titanium tetrabromide, titanium tetraiodide, titanium bromotrichloride, titanium dichlorodiodide, titanium bromotriodide, titanium tribromo-n-butoxide, titanium trichloroethoxide, and the like, and mixtures thereof. A particularly preferred compound is titanium tetrachloride because of its availability and efficacy.

The cocatalyst component B can be an organometal compound or a hydride of an element selected from Groups IA, IIA, and IIIA of the Periodic Table as shown on page B-2, Handbook of Chemistry and Physics, Chemical Rubber Company, 45th Edition (1964). Of particular interest because of availability and efficacy or organoaluminum compounds which can be expressed as $AlR'_bY_{3-b}$ in which R' is as above, Y is a monovalent radical selected from among the halogens and hydrogen, and b is an integer of 0 to 3. Examples of specific compounds include trimethylaluminum, triethylaluminum, triisobutylaluminum, tridodecylaluminum, tricyclohexylaluminum, triphenylaluminum, tribenzylaluminum, diethylaluminum chloride, ethylaluminum dichloride, isopropylaluminum dibromide, diisobutylaluminum hydride, and the like, and mixtures thereof.

The mole ratio of chemically treated silica to tetravalent titanium compound can range from about 1:1 to about 1000:1, preferably from about 10.1 to about 300:1.

The mole ratio of tetravalent titanium compound to dihydrocarbylmagnesium compound can range from about 0.1:1 to about 20:1, preferably frorm about 0.2:1 to about 10:1.

The amount of cocatalyst component B employed with the catalyst during polymerization can vary rather widely from about 0.005 mole to about 10 mmole per liter of reactor contents. However, particularly good results are obtained at a more preferred range from about 0.01 mmole to about 2.5 mmole per liter of reactor contents.

Catalyst component A is prepared by mixing the chemically treated silica-containing finely divided organic solid with the dihydrocarbylmagnesium compound and tetravalent titanium compound under conditions which will form a titanium-containing product. Conventional methods can be used for the mixing, reacting and contracting of the various compounds with a wide variance of conditions applicable. For example, the chemically treated silicon-containing compounds can be present as a slurry in a hydrocarbon such as a paraffin, for example, normal hexane, and then contacted with the dihydrocarbylmagnesium compound and tetravalent titanium compound.

In carrying out the various steps of the instant process a suitable inert diluent can be used such as aliphatic or cycloaliphatic hydrocarbons such as butane, pantane, hexane, heptane, cyclohexane, methylcyclohexane, as well as aromatic hydrocarbons including benzene and toluene. Generally, any well-known inert hydrocarbon diluent can be used.

The contacting and mixing steps following chemical treatment of the silica-containing support can be carried out generally at temperatures in the range of about −50° C. to about 200° C. with the decomposition temperatures of the tetravalent titanium compounds and the other organometallic compounds determining the limits. Usually the initial contacting can be carried out advantageously at a temperature of 0° C. to about 30° C. to avoid any premature reaction. The mixing temperature generally employed, more preferably ranges from about 20° C. to about 150° C.

The length of the contacting period can vary greatly with the time period generally ranging from about 1/4 to about 10 hours.

The polymerization process can be effected in a batchwise or in a continuous fashion by employing any conventional mode of contact between the catalyst system and the monomer or monomers. Thus, the monomer can be polymerized by contact with the catalyst system in solution, in suspension, or in gaseous phase at temperatures ranging from about 20°–200° C. and pressures ranging from about atmospheric to about 1,000 psia (6.9 MPa). The polymerization process can be conducted batchwise such as in a stirred reactor or continuously such as in a loop reactor under turbulent flow conditions sufficient to maintain the catalyst in suspension.

The ethylene polymers produced are normally solid ethylene homopolymers or polymers prepared by copolymerizing ethylene with at least one aliphatic 1-olefin containing from 3 to about 10 carbon atoms or a conjugated acyclic diolefin containing 4 to 5 carbon atoms. In such polymers, the ethylene content can range from about 80 to 100 mole percent. The polymers can be converted into various useful items including films, fibers, pipe, containers, and the like by employing conventional plastics fabrication equipment.

It is especially convenient when producing ethylene polymers to conduct the polymerization in the presence of a dry hydrocarbon diluent inert in the process such as isobutane, n-heptane, methylcyclohexane, benzene, and the like at a reactor temperature ranging from about 60° C. to about 110° C. and a reactor pressure ranging from about 250 to about 600 psia (1.7–4.1 MPa). In such a process, particle form polymerization, the polymer is produced as discrete solid particles suspended in the reaction medium. The polymer can be recovered, can be treated to deactivate and/or remove catalyst residues, can be stabilized with an antioxidant system, and can be dried, all as known in the art to obtain the final product. Also, molecular weight controllers such as hydrogen can be employed in the reactor as is known in the art to adjust the molecular weight of the product, if desired.

EXAMPLE 1

Control Catalysts and Ethylene Polymerization

Individual 2-4 g portions of a commercially available catalytic grade unscreened silica base having a pore volume of 1.6 cc/g and a surface area of 300 square meters per gram were calcined 4 hours at a specified temperature in a 46 mm OD quartz tube under fluidizing conditions with dry air or as specified. After cooling, each silica portion was impregnated with a solution of dibutylmagnesium (12.6 wt. % in n-heptane) sufficient to provide a calculated 0.5 wt. % magnesium. After removing the solvent by evaporation each treated sample was contacted with about 25 ml n-heptane containing 1 ml of TiCl$_4$ at 25° C. This slurry was then refluxed at about 97° C. for 10 min. Excess TiCl$_4$ was removed by several washes with n-heptane and the product dried to remove solvent. The amount of titanium expressed as the metal was determined for each catalyst by analysis.

Ethylene was polymerized batchwise in a particle form process in each run by employing a 2 liter stirred, stainless steel reactor containing about 1 liter (600 g) of dry isobutane. The reactor was charged with the catalyst, then with 1 ml of cocatalyst solution consisting of 10 wt. % triisobutylaluminum (TIBA) in dry n-heptane (0.35 mmoles TIBA) along with a few ml isobutane, and the reactor and contents were heated to 80° C. At that time sufficient hydrogen and ethylene was separately added to each to provide a partial pressure of 100 psi (0.79 MPa) and the run was conducted for 1 hour. Ethylene was supplied from a reservoir as needed to maintain the pressure during each run.

The run was terminated by flashing the isobutane diluent, hydrogen, and ethylene from the reactor, removing the product, and drying and weighing it to determine the yield. The melt index (MI) of the product was determined in accordance with ASTM D1238-65T, condition E and the high load melt index (HLMI) of the product was determined as per ASTM D1238-65T, condition F. The HLMI/MI ratio is believed to indicate a measure of the molecular weight distribution of the polymer, the higher the value, the broader the molecular weight distribution.

The calculated productivity of each catalyst is expressed in terms of grams polyethylene per gram catalyst per hour (g/g cat.) and in terms of kilograms polyethylene per gram titanium per hour (kg/g Ti).

The silica calcining temperature employed and polymerization results obtained are given in Table 1.

TABLE I

| | | | | | | | | | | |
|---|---|---|---|---|---|---|---|---|---|---|
| | | Ethylene Polymerization Control Runs | | | | | | | | |
| | Silica | Catalyst | | | | Polymer | | | calculated mole ratios | |
| Run No. | Calcining Temp. °C. | Weight | Wt. % Ti | Productivity g/g/cat | kg/g Ti | Wt. g | MI | HLMI/ MI | SiO$_2$ TiCl$_4$ | TiCl$_4$ Mg(Bu)$_2$ |
| 1 | 300 | 0.6036 | 4.63 | 560 | 12.1 | 338 | 0.22 | 80 | 14 | 4.8 |
| 2 | 450 | .3208 | 3.49 | 374 | 10.7 | 120 | 4.1 | 51 | 20 | 3.6 |
| 3 | 600 | .3215 | 2.63 | 373 | 14.2 | 120 | 4.8 | 42 | 27 | 2.7 |
| 4 | 750 | .3814 | 2.1$^{(a)}$ | 319 | 15.2 | 122 | 4.9 | 37 | 35 | 2.2 |
| 5 | 800 (CO) | .6545 | 1.86 | 336 | 18.0 | 200 | 6.9 | 39 | 40 | 1.9 |
| 6 | 900 | .3526 | 1.59 | 337 | 21.1 | 119 | 13.9 | 36 | 47 | 1.7 |

$^{(a)}$Estimated value.

The results given in Table 1 are typical for catalysts consisting of a titanium compound or complex on a silica substrate. As the calcining temperature of the silica is increased the amount of titanium fixed on the silica decreases and the melt index of the polymer tends to increase as control run 1 vs. control run 6 demonstrates. The silica for the catalyst used in run 5 was calcined in a carbon monoxide ambient. Polymer made with it has a somewhat higher melt index than that made in run 4 but both polymers exhibit about the same molecular weight distribution (relatively narrow) based on the HLMI/MI results.

The polymer obtained in run 1 was screened using a set of standard screens (U.S. Sieve Series) consisting of mesh sizes 30, 50, 80, 100, 200 and pan. The wt. % of the polymer found on the screens was as follows:

| screen size, mesh | 30 | 50 | 80 | 100 | 200 | pan |
|---|---|---|---|---|---|---|
| wt. % polymer | 87.7 | 11.5 | 0.6 | 0.1 | 0.2 | 0 |

The results are typical of catalysts of this description and demonstrate that good particle size control (few fines, narrow particle size distribution) can be attained with the catalysts prepared in the presence of silica.

EXAMPLE 2

Invention Catalyst Derived From Chlorinated Silica and Ethylene Polymerization

A 13 g portion of the silica based described in the first example was fluidized at 800° C. in nitrogen which had been bubbled through carbon tetrachloride at room temperature. The treatment lasted two hours and approximately 77 gm of $CCl_4$ was employed.

Analysis showed that the recovered, cooled product contained about 1.2 mmoles Cl per gram of silica. A portion of the product was then treated sequentially with dibutylmagnesium to provide 0.5 wt. % magnesium and then with $TiCl_4$ as in the first example. Silica:Cl mole ratio was 14:1.

A portion of the recovered product, an invention catalyst, was used to polymerize ethylene in the manner described in the first example.

The results of the polymerization are given in Table 2 along with run 4 of Example 1 as a control.

TABLE 2

| | Ethylene Polymerization with Catalyst Derived from Chlorinated Silica | | | | | | | | | |
|---|---|---|---|---|---|---|---|---|---|---|
| | Silica Treatment | | Catalyst | | | | Polymer | | Calculated mole ratios | |
| Run No. | Temp. ° C. air | $CCl_4$ | Weight g | Wt. % Ti | Productivity g/g cat | kg/g Ti | Weight g | MI | HLMI/ MI | $SiO_2$ $TiCl_4$ | $TiCl_4$ $Mg(Bu)_2$ |
| 7 | —(a) | 800 | 0.4932 | 0.68 | 151 | 22.2 | 74.4 | 3.8 | 62 | 114 | 0.7 |
| 4 | 750 | — | .3814 | 2.1 | 319 | 15.2 | 122 | 4.9 | 37 | 35 | 2.2 |

(a)A dash signifies not applicable.

The results in Table 2 show that chlorinating the silica significantly affects the amount of titanium subsequently retained by the catalyst following the $TiCl_4$ treatment. Thus the invention catalyst in run 7 contained 0.68 wt. % titanium whereas the unchlorinated silica of control run 4 which was calcined in air at about the same temperature contained about 2.1 wt. % titanium. This indicates about a 68% decrease in titanium content due to chlorination of the silica. On the other hand, the activity of the invention catalyst only dropped by about 50% based on the amount of grams polyethylene produced per gram of catalyst. Therefore, the invention catalyst utilizes its titanium more efficiently than the control catalyst. This is shown in the productivity figures based on titanium content where the invention catalyst produces 22.2 kg polyethylene per gram titanium compared to 15.2 kg polyethylene per gram titanium for the control catalyst.

The invention catalyst also produced a broader molecular weight distribution polymer than the control catalyst based on the HLMI/MI (62 HLMI/MI compared to 37 for the control catalyst, the results obtained at roughly the same MI for each polymer.)

EXAMPLE 3

Invention Catalyst Derived From Methoxylated Silica and Ethylane Polymerization

A 13 g portion of the silica base described in the first example was fluidized at 350° C. in nitrogen which was bubbled through methanol at room temperature. Treating time was one hour. The amount of methanol employed was approximately 16 gm. Silica/methanol mole ratio was 0.4:1.

A portion of the recovered, cooled product was then treated sequentially with dibutylmagnesium to provide 0.5 wt. % magnesium and then with $TiCl_4$ as in the first example.

A portion of the recovered product, an invention catalyst, was used to polymerize ethylene in the manner described in the first example.

The results of the polymerization are given in Table 3 along with runs 1 and 2 of Example 1 as controls.

TABLE 3

| | Ethylene Polymerization with Catalyst Derived from Methoxylated Silica | | | | | | | | | | |
|---|---|---|---|---|---|---|---|---|---|---|---|
| | Silica Treatment | | Catalyst | | | | Polymer | | | Calculated mole ratios | |
| Run No. | Temp. ° C. air | MEOH | Weight g | Wt. % Ti | Productivity g/g cat | kg/g Ti | Weight g | MI | HLMI/ MI | $SiO_2$ $TiCl_4$ | $TiCl_4$ $Mg(Bu)_2$ |
| 8 | —(a) | 350 | 0.5388 | 0.83 | 353 | 42.5 | 190 | 7.9 | 32 | 93 | 0.9 |
| 1 | 300 | — | .6036 | 4.63 | 560 | 12.1 | 338 | 0.22 | 80 | 14 | 4.8 |
| 2 | 450 | — | .3208 | 3.49 | 374 | 10.7 | 120 | 4.1 | 51 | 20 | 3.6 |

(a) A dash signifies not applicable.

The results in Table 3 show that the methoxylated silica retains considerably less titanium (0.83 wt. %) than the controls (4.63 wt. % and 3.49 wt. %, respectively). However, the invention catalyst uses its titanium very efficiently compared to the controls. The calculated productivity results based on kg polyethylene per gram titanium show that 42.5 kg polyethylene per gram titanium result with the invention catalyst and only 12.1 and 10.7 kg polyethylene per gram titanium, respectively, for the control catalysts.

Anothr feature of the invention catalyst is shown by the sharp increase in melt index (7.9) of the polyethylene made with it compared to the 0.22 and 4.1 values for the polymers made with the controls. In addition, the polymer made with the invention catalyst exhibits a narrower molecular weight distribution based on a HLMI/MI ratio of 32 than the polymers made with the control catalysts. Those polymers have values of 80 and 50 for HLMI/MI.

EXAMPLE 4

Invention Catalyst Derived From Silated Silica and Ethylene Polymerization

A 13 g portion of the silica base described in the first example was fluidized at 500° C. in nitrogen and contacted with 2 ml (1.71 g) of trimethylchlorosilane vaporized into the nitrogen stream. Silica/silane mole ratio was 14:1.

A portion of the recovered, cooled product was then treated sequentially with dibutylmagnesium to provide 0.5 wt. % magnesium and then with TiCl$_4$ as in the first example.

A portion of the recovered product, an invention catalyst, was used to polymerize ethylene in the manner described in the first example.

The results of the polymerization are given in Table 4 along with runs 2 and 3 of Example 1 as controls.

EXAMPLE 5

Invention Catalyst Derived from Dichloroacetylated Silica and Ethylene Polymerization A 5.3 g portion of the silica base described in the first example, previously calcined at about 260° C. in air, was slurried in n-heptane and then refluxd with one ml (1.53 g) of dichloroacetyl chloride.

The recovered dichloroacetylated silica was then treated sequentially with dibutylmagnesium to provide 0.5 wt. % magnesium and then with TiCl$_4$ as in the first example. Titanium analyses were not obtained.

A 0.6214 g portion of the recovered product, an invention catalyst, was used to polymerize ethylene in run 10 in the manner described in the first example.

The polymerization results showed that 116 grams of polyethylene was produced with 0.6214 g of catalyst thus giving 187 grams polyethylene per gram of catalyst. It was determined that the polyethylene had a HLMI of 3. The nearest comparable control catalyst is shown in run 1 of Example 1 where the catalyst is derived from silica calcined at 300° C. The HLMI of that polymer is 17.6 as determined from the MI and HLMI/MI values given. Thus, catalysts derived from dichloracetylated silica produce polyethylene in a particle form process having lower melt flows than control catalysts in the absence of the treatment. Since an inverse relationship exists between melt flow (melt index) and molecular weight, the invention catalyst is capable of producing higher molecular weight polymer than the control catalyst.

EXAMPLE 6

TABLE 4

Ethylene Polymerization with Catalyst Derived from Silated Silica

| Run No. | Silica Treatment Temp. ° C. Air | SiCl(CH$_3$)$_3$ | Weight g | Wt. % Ti | Productivity g/g cat | Productivity kg/g Ti | Polymer Wt. g | MI | HLMI/ MI | SiO$_2$/ TiCl$_4$ | TiCl$_4$/ Mg(Bu)$_2$ |
|---|---|---|---|---|---|---|---|---|---|---|---|
| 9 | —(a) | 500 | 0.5477 | 1.12 | 394 | 35.3 | 216 | 5.9 | 36 | 68 | 1.2 |
| 2 | 450 | — | .3208 | 3.49 | 374 | 10.7 | 120 | 4.1 | 51 | 20 | 3.6 |
| 3 | 600 | — | .3215 | 2.63 | 373 | 14.2 | 120 | 4.8 | 42 | 27 | 2.7 |

(a)dash signifies not applicable.

The results in Table 4 show that the silated silica retains less titanium (1.12 wt. %) than either of the controls (3.49 wt. % and 2.63 wt. %, respectively). Thus, the invention catalysts uses its titanium more efficiently than the control catalysts based on calculated productivity results in terms of kg polyethylene per gram titanium. In invention run 9, the value is 35.3 kg polyethylene per gram titanium compared to control runs 2, 3 where the corresponding values are 10.7 and 14.2 kg polyethylene per gram titanium, respectively. Also, the polymer produced with the invention catalyst has a narrower molecular weight distribution (HLMI/MI of 36) compared to the polymers produced with the control catalysts (HLMI/MI of 51 and 42, respectively).

Invention Catalysts Derived from Trialkylborane - Treated Silica and Ethylene Polymerization Individual 3 g portions of the silica base described in the first example, calcined at the specified temperature, were slurried in about 20 ml of n-heptane and then refluxed 10-20-minutes with 0.07 g or 0.13 g of triethylborane sufficient to given the desired amount of boron compound as expressed as the element. Each recovered product was then treated sequentially with dibutylmagnesium to provide 0.5 wt. % magnesium and then with TiCl$_4$ as in the first example.

A portion of each recovered product was used to polymerize ethylene in the same manner as in the first example.

The results of the polymerization tests are given in Tables 5 along with runs 1 and 4 of Examples 1 as controls.

TABLE 5
Ethylene Polymerization with Catalysts Derived from Triethylborane - Treated Silica

| Run No. | Silica Calcined Temp. °C. | Weight g | Wt. % B(Calc.) | Wt. % Ti | Productivity g/g cat | Productivity kg/g Ti | Polymer Wt. g | Polymer MI | Polymer HLMI/MI | Calculated mole ratios SiO$_2$/TiCl$_4$ | Calculated mole ratios TiCl$_4$/Mg(Bu)$_2$ |
|---|---|---|---|---|---|---|---|---|---|---|---|
| 11[c] | 300 | 0.5080 | 0.25 | nd[a] | 476 | —[b] | 242 | .65 | 92 | — | — |
| 12[c] | 750 | .3882 | .25 | nd | 477 | — | 185 | 4.3 | 37 | — | — |
| 13[c] | 750 | .4146 | .25 | 1.0 | 357 | 35.7 | 148 | 1.9 | 43 | 75 | 1.0 |
| 14[d] | 750 | .4113 | .50 | 1.0 | 165 | 16.5 | 68 | 1.1 | 52 | 73 | 1.0 |
| 1 | 300 | .6036 | — | 4.63 | 560 | 12.1 | 338 | 0.22 | 80 | 14 | 4.8 |
| 4 | 750 | .3814 | — | 2.1 | 319 | 15.2 | 122 | 4.9 | 37 | 35 | 2.2 |

[a] nd signifies not determined.
[b] A dash signifies not applicable.
[c] Runs 11, 12, 13 mole ratio was 70:1 for silica:triethylborane (TEB).
[d] Run 14 mole ratio was 34:1 for silica:TEB.

In invention runs 13, 14 the catalyst activity per gram of titanium (35.7 kg and 16.5 kg polyethylene per gram titanium, respectively) is increased over the control catalyst in run 4 (15.2 kg polyethylene per gram titanium). The main effect of the invention catalysts derived from the triethylborane treated silica, however, appears to reside in a broadening of the molecular weight distribution of the polymers produced with them based on the HLMI/MI results although some scatter is evident. This is seen by comparing invention run 11 (HLMI/MI of 92) with control run 1 (HLMI/MI of 80). The results with the invention catalyst of run 12 and control catalyst of run 4 appear to be equivalent. Note, however, that higher HLMI/MI values are obtained with the invention catalysts of runs 13, 14 compared with those obtained with the control catalyst of run 4.

To summarize, the difference in behavior of the various invention catalysts compared to the control catalysts with respect to the molecular weight distribution based on HLMI/MI values (the higher the value the broader the distribution) and retention of titanium is shown below.

| Catalyst Derivation | HLMI/MI Ratio | Ti Retention |
|---|---|---|
| Chlorinated silica | Higher | Lower |
| Alkanol-treated silica[a] | Lower | Lower |
| Silated silica | Lower | Lower |
| Carboxylic acid chloride-treated silica[b] | Not Determined | Not determined |
| Organoboron-treated silica | Higher | About the same |

[a] Increased melt index potential of the catalyst.
[b] Decreased melt index potential of the catalyst.

All of the catalysts give good particle size control of polymer made with them. It should be noted that the productivities reported in the Examples appear to be low. They are low because of the high hydrogen pressure used (100 psi) and relatively low ethylene pressure (100 psi). Productivities in the range of from about 2000 to 5000 grams polymer per gram catalyst can be realized under more optimum reactor conditions, e.g., lower hydrogen pressure and higher ethylene pressure.

Good particle size control of produced (as made) polymers coupled with a means to control polymer melt index and molecular weight distribution, and retention of titanium in the catalyst can all be realized by treating the silica support as described in this invention and preparing the catalyst with the treated support.

We claim:

1. A process for the production of ethylene homopolymer which comprises contacting ethylene under polymerization conditions with a catalyst comprising
    (1) a solid complex titanium-containing catalyst A obtained by mixing
        (a) a pretreated particulate silicia-containing supporting containing at least 80 wt. % silica formed by reacting said support with an oroganoboron compound comprising a trihydrocarbyl boron compound having the formula B(R$^3$)$_3$ in which R$^3$ is selected from among hydrogen, alkyl, aryl and cycloalkyl, at least one R$^3$ in each compound being a hydrocarbon radical containing from 1 to about 6 carbon atoms under conditions such that at least a portion of the OH group on the surface of the silica-containing support is reacted with the treating agent with
        (b) an organomagnesium compound of the formula MgR$_2$ wherein R is a hydrocarbon radical having from 1 to 12, inclusive, carbon atoms and
        (c) a halogenated tetravalent titanium compound of the formula TiX$_n$(OR')$_{4-n}$ in which X is a bromide, chlorine, or iodine, R' is a hydrocarbon radical selected from saturated aliphatic, saturated cycloaliphatic and aromatic groups containing from 1 to about 12, inclusive, carbon atoms, and n in an integer of 3 to 4 and
    (2) a cocatalyst component B comprising a metallic hydride or organometal compound wherein said metal is selected from a metal of Groups IA, IIA, and IIIA of the Periodic Table.

2. A process according to claim 1 wherein said organoboron compound is triethylborane, said organomagnesium compound is dibutyl magnesium, said titanium compound is titanium tetrachloride, and said cocatalyst component B is triisobutylaluminum

* * * * *